July 21, 1959
O. BURDEN
2,895,250
FISH LURE RETRIEVER
Filed Oct. 8, 1957
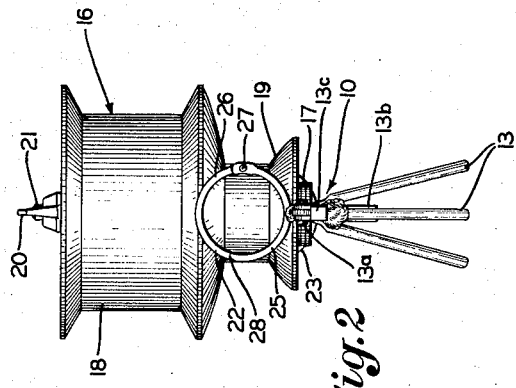
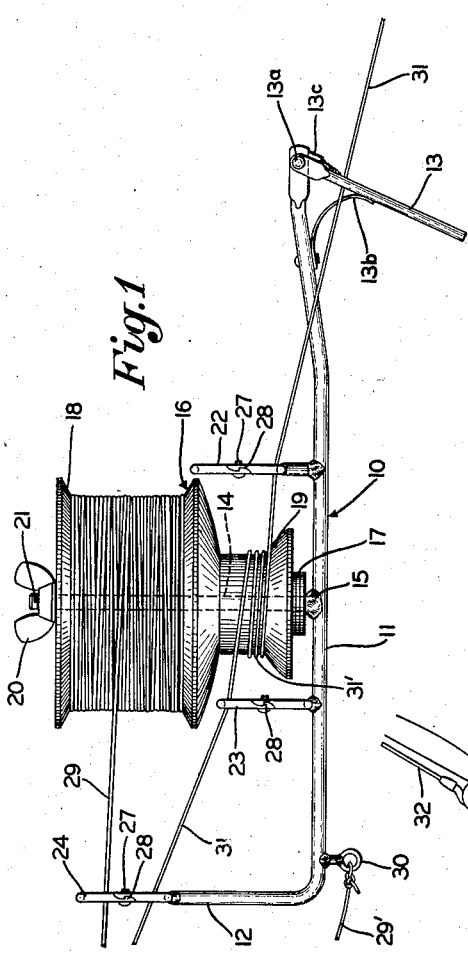
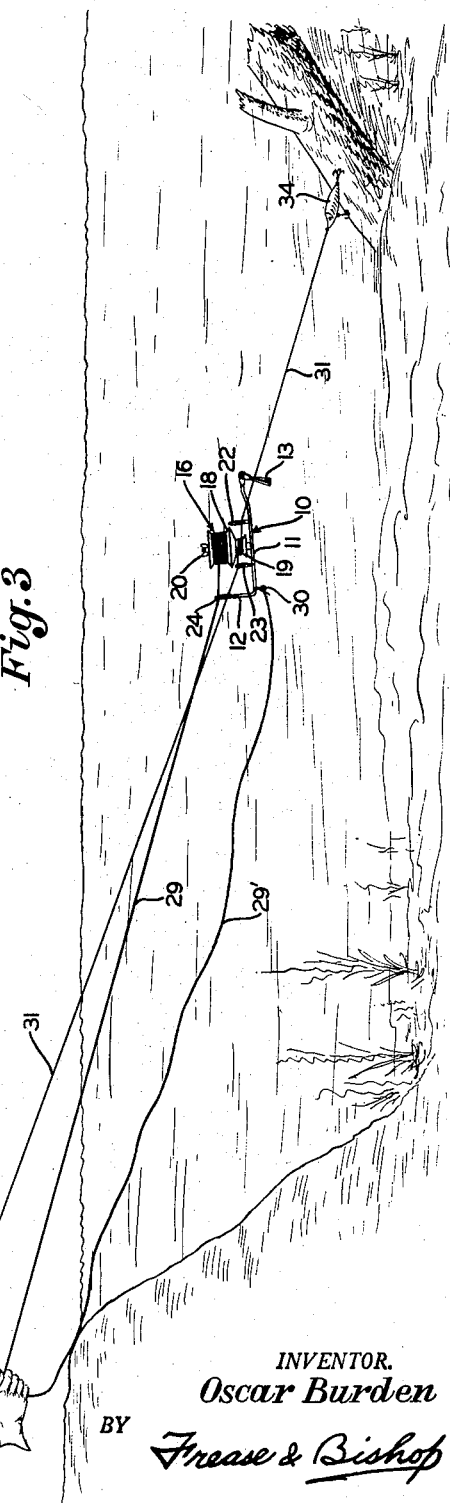
INVENTOR.
Oscar Burden
BY Frease & Bishop
ATTORNEYS United States Patent Office 2,895,250
Patented July 21, 1959

2,895,250

FISH LURE RETRIEVER

Oscar Burden, Alliance, Ohio

Application October 8, 1957, Serial No. 688,920

4 Claims. (Cl. 43—17.2)

The invention relates to means for recovering plugs, spinners and other artificial fish lures which have become snagged or entangled in stumps, weeds, rocks, tree branches and the like, and more particularly to a device adapted to be propelled along a fish line toward the lure which has been snagged.

In the sport of fishing by bait casting, fly casting or the like, it frequently happens that the artificial plug, spinner, fly or other lure upon the end of the fish line becomes caught or snagged in a submerged tree stump, rocks, weeds or the like, in such manner that it is impossible to release the same by pulling upon the fish line without tearing or breaking the line and thus losing the lure.

It also happens that in casting the artificial lure into the water, as it is swung over head, it may become entangled in tree branches at such height above the ground that it is difficult if not impossible to release the same, often making it necessary to cut or tear the fish line and thus lose the artificial lure.

The object of the present invention is to provide a device for use either under water or overhead for quickly and easily releasing an artificial fish lure which has been snagged or entangled in this manner.

Another object of the invention is to provide such a device which will release and retrieve fish lures without putting undue strain upon the fish line.

A further object is to provide a device of this character which may be controlled from a position on the shore, or on the ground, for causing the same to travel along the fish line to the lure which is entangled or caught.

A still further object is to provide a fish lure retriever of this type wihch is buoyant so that it will float through the water to a submerged fish lure.

It is also an object of the invention to provide such a device having a rotatable spool thereon, around which the fish line may be snubbed, with means controlled at a distance therefrom for rotating the spool so as to cause the retriever to travel along the fish line to the snagged or entangled lure.

A further object of the invention is to provide a fish lure retriever of the type referred to, in which the rotatable spool has two drum or reel surfaces thereon, the fish line being snubbed around one of said reel surfaces, a relatively heavy line being wrapped around the other reel surface, whereby unwinding of said heavy line causes the device to travel forwardly along the fish line to the lure.

The above objects together with others which will be apparent from the drawing and following description, or which may be later referred to, may be attained by constructing the improved fish lure retriever in the manner illustrated in the accompanying drawing and hereinafter described in detail, in which;

Fig. 1 is a side elevation of a fish lure retriever embodying the invention;

Fig. 2 is a front elevation of the improved fish lure; and

Fig. 3 is a view showing the manner in which the retriever is used to release a snagged or entangled fish lure.

Referring now more particularly to the embodiment illustrated in the drawing, in which similar numerals refer to similar parts throughout, the improved fish lure retriever includes a wire frame, indicated generally at 10, and comprising a straight, substantially horizontal wire rod 11, the rear end of which is bent upward to form the upright post 12.

At the forward end of the horizontal wire rod 11 is attached a plurality of downwardly and rearwardly inclined prongs or tines 13, in the general arrangement of a fork or rake, the prongs being preferably angularly inclined away from each other toward their lower ends, as best shown in Fig. 2.

Although the prongs 13 may be rigidly attached to the frame wire 11, they are shown as pivoted thereto as indicated at 13a in Figs. 1 and 2. A spring 13b normally holds the prongs 13 in extended position in contact with the stop lug 13c on the end of the wire 11. This allows the prongs to swing backward to pass over the plug and then spring forward to engage behind the plug.

At a point intermediate the ends of the horizontal wire member 11, an upright rod or shaft 14 is welded, or otherwise rigidly attached, to the wire 11 as indicated at 15.

A double reel spool or roller, indicated generally at 16, is journalled upon the shaft 14, washers 17 being preferably located around the lower end of the shaft in order to slightly space the double reel or roller away from the horizontal frame member 11, so as to permit it to easily rotate upon the shaft.

This spool or roller 16 is preferably formed of buoyant material and may be of wood, hollow plastic construction or the like so that it will have sufficient buoyancy to float the entire device, thus preventing undue weight or drag upon the fish line, when the retriever is used.

The spool or roller 16 comprises the upper, relatively large reel or drum 18 and the lower, relatively small reel or drum 19 formed integrally upon or rigidly attached thereto. A thumb nut 20, or the like, may be placed upon the threaded upper end 21 of the shaft 14 to prevent the spool 16 from becoming accidentally disengaged from the shaft while in use.

Rings 22 and 23 are rigidly mounted upon the top of the horizontal wire member 11 at spaced points in front of and behind the smaller reel or drum 19. A similar ring or eye 24 is fixed upon the upper end of the upright post 12 at the rear end of the frame of the device.

Each of the eyes or rings 22, 23 and 24 is a separable ring of the construction best shown in Fig. 2, in which the ring 22 comprises the lower, stationary half 25 and the upper, movable half 26, hingedly connected as at 27 to the lower portion 25. The free end of the hinged half 26 of each ring is adapted to detachably engage the lower half 25 as indicated at 28.

A relatively heavy line 29 is attached to the large drum or reel 18 and wrapped therearound, the free end of said line being extended rearwardly through the eye 24 upon the rear post 12. If desired, this line 29 may then be brought back, as indicated at 29', and tied to the eye or knob 30 on the underside of the wire member 11 near the rear end thereof.

When a plug, or other artificial lure, upon a fish line becomes snagged or caught, the fish lure retriever above described is then attached to the fish line. For this purpose, the nut 20 is unscrewed from the shaft 14 so that the double spool 16 may be removed from the shaft.

The fish line, as indicated at 31, is then snubbed around the small drum or reel 19, about three or four turns, as indicated at 31' in Fig 1. The double spool 16 is then replaced upon the shaft 14 and the nut 20 replaced on the upper end of the shaft.

The separable rings 22, 23 and 24 are opened so that the fish line 31 may be located therethrough in the manner best shown in Fig. 1 and these rings are again closed. The fisherman then holds the fish line 31 tight, without putting any undue strain thereon, by manipulating the rod 32 with reel 33 thereon in suitable manner as shown in Fig. 3.

With the other hand, the line 29 is then pulled to unreel the same from the large drum or reel 18, thus rotating the double spool 16. This rotation of the smaller drum or reel 19 causes the device to travel along the fish line 31 toward the snagged or entangled lure 34 as indicated in Fig. 3.

When the retriever has been moved all the way out to the lure, so that prongs 13 of the retriever may engage the lure, then both strands 29 and 29' of the heavier line are grasped and pulled toward shore, the prongs 13 engaging behind the lure and pulling it away from the tree stump, weeds or other objects with which it is entangled, and the fish line may be reeled in at the same time that the retriever is pulled toward shore by the line 29.

In the same manner, if a plug or lure is entangled in a tree branch overhead, the device may be positioned upon the fish line in the manner above described and operated to travel upwardly and forwardly along the fish line until it engages the lure.

From the above it will be apparent that a simple, efficient and easily operated fish lure retriever is provided which may be quickly and easily attached to or detached from a fish line; which is buoyant and may be floated under water along the fish line and which is of such light weight that when used for disentangling a fish lure from an overhead branch, it will not put any undue weight on the fish line upon which it is used.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. A retriever for a lure attached to one end of a fish line, said retriever comprising a substantially L-shape frame having a substantially horizontal portion with an upright post at its rear end, an upright shaft on said frame spaced forwardly from said upright post, a spool journalled upon said shaft, said spool comprising integral upper and lower drums, the upper drum being of relatively large diameter and the lower drum being of relatively small diameter, eyes upon the frame forwardly and rearwardly of the lower drum, an eye upon said upright post, means for snubbing the fish line around the lower drum and threading it through said eyes, the free end of the fish line being relatively fixed, and a second line wrapped around the upper drum, the free end of said second line extending rearwardly and being threaded through the eye on said upright post, whereby a steady pull upon said free end of said second line will cause said second line to be continuously unwound from the upper drum continuously rotating the lower drum causing the retriever to continuously travel forwardly along the fish line toward the lure.

2. A retriever for a line attached to one end of a fish line, said retriever comprising a substantially L-shape frame having a substantially horizontal portion with an upright post at its rear end, an upright shaft on said frame spaced forwardly from said upright post, a spool journalled upon said shaft, said spool comprising integral upper and lower drums, the upper drum being of relatively large diameter and the lower drum being of relatively small diameter, separable eyes upon the frame forwardly and rearwardly of the lower drum, a separable eye upon said upright post, means for snubbing the fish line around the lower drum and threading it through said eyes, the free end of the fish line being relatively fixed, and a second line wrapped around the upper drum, the free end of said second line extending rearwardly and being threaded through the eye on said upright post, whereby a steady pull upon said free end of said second line will cause said second line to be continuously unwound from the upper drum continuously rotating the lower drum causing the retriever to continuously travel forwardly along the fish line toward the lure.

3. A retriever for a lure attached to one end of a fish line, said retriever comprising a substantially L-shape frame having a substantially horizontal portion with an upright post at its rear end, angularly disposed prongs at the forward end of said frame, an upright shaft on said frame spaced forwardly from said upright post, a spool journalled upon said shaft, said spool comprising integral upper and lower drums, the upper drum being of relatively large diameter and the lower drum being of relatively small diameter, eyes upon the frame forwardly and rearwardly of the lower drum, an eye upon said upright post, means for snubbing the fish line around the lower drum and threading it through said eyes, the free end of the fish line being relatively fixed, and a second line wrapped around the upper drum, the free end of said second line extending rearwardly and being threaded through the eye on said upright post, whereby a steady pull upon said free end of said second line will cause said second line to be continuously unwound from the upper drum continuously rotating the lower drum causing the retriever to continuously travel forwardly along the fish line to engage said prongs with the lure.

4. A retriever for a lure attached to one end of a fish line, said retriever comprising a substantially L-shape frame having a substantially horizontal portion with an upright post at its rear end, angularly disposed prongs pivotally mounted at the forward end of said frame, an upright shaft on said frame spaced forwardly from said upright post, a spool journalled upon said shaft, said spool comprising integral upper and lower drums, the upper drum being of relatively large diameter and the lower drum being of relatively small diameter, eyes upon the frame forwardly and rearwardly of the lower drum, an eye upon said upright post, means for snubbing the fish line around the lower drum and threading it through said eyes, the free end of the fish line being relatively fixed, and a second line wrapped around the upper drum, the free end of said second line extending rearwardly and being threaded through the eye on said upright post, whereby a steady pull upon said free end of said second line will cause said second line to be continuously unwound from the upper drum continuously rotating the lower drum causing the retriever to continuously travel forwardly along the fish line to engage said prongs with the lure.

References Cited in the file of this patent

UNITED STATES PATENTS

| | | |
|---|---|---|
| 2,421,466 | Schenaver | June 3, 1947 |
| 2,479,642 | Schiffmann | Aug. 23, 1949 |
| 2,607,906 | Cox | Oct. 1, 1957 |
| 2,807,906 | Chan Mun | Oct. 1, 1957 |

FOREIGN PATENTS

| | | |
|---|---|---|
| 132,186 | Sweden | July 3, 1951 |